US012089314B2

(12) United States Patent
Meerbeek et al.

(10) Patent No.: US 12,089,314 B2
(45) Date of Patent: Sep. 10, 2024

(54) CONTROL SYSTEM FOR ASSISTING A USER IN INSTALLING A LIGHT SOURCE ARRAY AT A DISPLAY AND A METHOD THEREOF

(71) Applicant: SIGNIFY HOLDING B.V., Eindhoven (NL)

(72) Inventors: Berent Willem Meerbeek, Veldhoven (NL); Dzmitry Viktorovich Aliakseyeu, Eindhoven (NL); Niek Marcellus Cornelis Janssen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 94 days.

(21) Appl. No.: 18/009,365

(22) PCT Filed: May 28, 2021

(86) PCT No.: PCT/EP2021/064311
§ 371 (c)(1),
(2) Date: Dec. 9, 2022

(87) PCT Pub. No.: WO2021/249787
PCT Pub. Date: Dec. 16, 2021

(65) Prior Publication Data

US 2023/0262862 A1 Aug. 17, 2023

(30) Foreign Application Priority Data

Jun. 9, 2020 (EP) .................................... 20178866

(51) Int. Cl.
*H05B 47/155* (2020.01)
*H05B 47/175* (2020.01)

(52) U.S. Cl.
CPC ......... *H05B 47/155* (2020.01); *H05B 47/175* (2020.01)

(58) Field of Classification Search
CPC .. H05B 47/155; H05B 47/175; F21V 33/0052
(Continued)

(56) References Cited

U.S. PATENT DOCUMENTS 10,440,794 B2 * 10/2019 Alexander ............. H05B 47/19
2010/0097408 A1 * 4/2010 Michael Marcellinus .................. G02B 6/001 345/83

(Continued)

FOREIGN PATENT DOCUMENTS

EP 2254396 A1 11/2010
EP 2854392 A1 4/2015

(Continued)

*Primary Examiner* — Ryan Jager

(57) ABSTRACT

A method (600) of assisting a user in installing a light source array (110) at a display (120) is disclosed. The light source array (110) comprising individually controllable lighting units, the method (600) comprising: receiving (602) first information indicative of dimensions of the display (120), receiving (604) second information indicative of dimensions the light source array (110), virtually segmenting (606) the light source array (110) into a plurality of segments based on the dimensions of the display (120) and the dimensions of the light source array (110), wherein each segment comprises a plurality of individually controllable lighting units, wherein a length of a first segment (112) corresponds to at least a part of a length of a first side of the display (120), and wherein a length of a second segment (114) corresponds to at least a part of a length of a second side of the display (120), controlling (608) lighting units of the first segment (112) according to a first light setting, and controlling (610) lighting units of the second segment (114) according to a second light setting different from the first light setting.

14 Claims, 7 Drawing Sheets

(58) Field of Classification Search
USPC .......................................................... 315/294
See application file for complete search history.

(56) References Cited

U.S. PATENT DOCUMENTS

| | | | | |
|---|---|---|---|---|
| 2012/0113644 | A1* | 5/2012 | Bruyneel | H05K 1/189 362/249.02 |
| 2015/0092115 | A1* | 4/2015 | Micewicz | H05B 47/165 348/798 |
| 2016/0098584 | A1* | 4/2016 | Van De Sluis | G06Q 30/0281 340/10.3 |
| 2018/0255625 | A1* | 9/2018 | Lashina | H05B 45/20 |
| 2019/0132928 | A1* | 5/2019 | Rodinger | H05B 45/20 |
| 2020/0051154 | A1* | 2/2020 | Engelen | G09G 5/026 |
| 2020/0245435 | A1* | 7/2020 | Meerbeek | H05B 47/105 |
| 2023/0262862 | A1* | 8/2023 | Meerbeek | H05B 47/175 315/294 |
| 2023/0262863 | A1* | 8/2023 | Aliakseyeu | H05B 45/20 315/294 |

FOREIGN PATENT DOCUMENTS

| | | | |
|---|---|---|---|
| EP | 3142468 | A1 | 3/2017 |
| WO | 2003067934 | A2 | 8/2003 |
| WO | 2008068718 | A2 | 6/2008 |
| WO | 2014170290 | A1 | 10/2014 |
| WO | 2019076667 | A1 | 4/2019 |
| WO | 2021249938 | A1 | 12/2021 |

* cited by examiner

600

CONTROL SYSTEM FOR ASSISTING A USER IN INSTALLING A LIGHT SOURCE ARRAY AT A DISPLAY AND A METHOD THEREOF

CROSS-REFERENCE TO PRIOR APPLICATIONS

This application is the U.S. National Phase application under 35 U.S.C. § 371 of International Application No. PCT/EP2021/064311, filed on May 28, 2021, which claims the benefit of European Patent Application No. 20178866.8, filed on Jun. 9, 2020. These applications are hereby incorporated by reference herein.

FIELD OF THE INVENTION

The invention relates to a method of assisting a user in installing a light source array at a display, and to a computer program product for executing the method. The invention further relates to a control system for assisting a user in installing a light source array at a display.

BACKGROUND

Current home systems comprise a plurality of controllable lighting devices. In such systems, the lighting devices can be controlled based on media content that is being rendered on a display. A user may, for example, play a movie or a game on the display of a display device (e.g. a television, a pc monitor, a tablet pc, a projector, etc.). The lighting devices may be controlled based on the media content that is being rendered on the display, for instance by analyzing colors of images that are rendered on the display and controlling the lighting devices accordingly. Alternatively, the lighting devices may be controlled according to a light script which comprises pre-programmed lighting control instructions for the lighting devices. The lighting control instructions are communicated to the lighting devices to control them in sync with the media content that is being rendered on the display. This brings the atmosphere of the movie or the game into the room of the user.

The lighting control instructions that are transmitted to the lighting devices depend on the location of the lighting devices relative to the display, such that locations of on-screen events (e.g. an explosion, a sunset, an object approaching from one side of the display, etc.) correspond to locations of light effects generated by the lighting devices. In present systems, a user interface is provided that enables a user to map the lighting devices on the display device, and thereby create a mapping of the lighting devices relative to the display. A map of a space is rendered on a screen of a mobile device (e.g. a smartphone), which shows a location of the display in the space. A user may position the lighting devices on the map of the space relative to the display, such that they can be controlled based on rendered media content accordingly.

A user may for example install a light strip behind the display device or in proximity of the display device, for example by placing the light strip on a surface (e.g. a wall, a tv cabinet, etc.) or on the back of the display device. Installing and configuring such a light strip with individually controllable lighting units can be cumbersome for an average user.

EP2854392A1 discloses a lighting system comprising a lighting tape comprising a plurality of light sources for being attached to a display unit in a specified configuration, wherein the lighting sources are configured to illuminate in response to a lighting control signal, and a lighting tape driver configured to generate the lighting control signal depending on the configuration of the lighting tape and the contents of a video signal to be displayed on display unit. A user of the lighting system may input the configuration of the lighting tape that is installed at the display unit. The user may calculate the number of light sources in each segment. For example, the user may attach a long lighting tape at the back of the display, and enter the number of LEDs. The lighting control signal is generated by a signal analyzer depending on the configuration of the lighting tape and the contents of a video signal to be displayed on display unit.

SUMMARY OF THE INVENTION

The inventors have realized that a user may not know how to install a light source array (e.g. a light strip) behind a display device (e.g. a TV). Display devices and light source arrays have different sizes. Different types of display devices have different diagonal lengths or different aspect ratios. Different light source arrays may vary in length, and some may be extendable while other are not. As a result, a user has to calculate or simply guess how to position the light source array with respect to the display. It is therefore an object of the present invention to improve installation of a light source array at a display.

According to a first aspect of the present invention, the object is achieved by a method of assisting a user in installing a light source array at a display, the light source array comprising multiple individually controllable lighting units, the method comprising:

- receiving first information indicative of dimensions of the display,
- receiving second information indicative of dimensions the light source array,
- virtually segmenting the light source array into a plurality of segments based on the dimensions of the display and the dimensions of the light source array, wherein each segment comprises a plurality of individually controllable lighting units of the multiple individually controllable lighting units, wherein a length of a first segment corresponds to at least a part of a length of a first side of the display, and wherein a length of a second segment corresponds to at least a part of a length of a second side of the display,
- controlling lighting units of the first segment according to a first light setting, and
- controlling lighting units of the second segment according to a second light setting different from the first light setting.

The light source array is virtually segmented into a plurality of segments which are each controlled according to a respective light setting based on the dimensions of the display and the light source array. Each segment comprises a plurality of individually controllable lighting units, wherein a length of a first segment corresponds to at least a part of a length of a first side of the display and wherein a length of a second segment corresponds to at least a part of a length of a second side of the display. By controlling each segment according to a different light setting, the user can see the different segments, and place each segment at a respective side of the display.

The light source array may, for example, be segmented in two segments, wherein the length of the first segment corresponds to the length of one of the sides (e.g. the right side) of the display. The length of the second segment may correspond to the length of second side (e.g. the top side) of the display, or to a part of the length of that side due to the length of the light source array. The light source array may for example not be long enough to cover the second side of the display fully. By controlling the first segment according to the first light setting, the user sees which part of the light source array should be placed at the first side. The light source array may be configured to be folded or bent by a user. Additionally or alternatively, a support surface holding the lighting units may be partially cut which enables the user to fold/cut/bend the light source array between the first and second segment such that the first segment can be placed at the first side and the second segment can be placed at the second side of the display. Additionally or alternatively, the light source array may comprise connectors between the lighting units, and a user may position an angled connector element between the two segments such that the first segment can be placed at the first side and the second segment can be placed at the second side of the display This improves installing the light source array for a user.

The method may further comprise: rendering, on a screen of a user interface device, a first virtual representation of the display and a second virtual representation of the light source array, wherein the second virtual representation reflects the first and second segments of the light source array, and wherein the second virtual representation is rendered on the screen such that a position of the first segment is proximate to the first side of the display on the screen, and such that a position of the second segment is proximate to the second side of the display on the screen. By rendering the second virtual representation of the light source array on the user interface such that the segments are positioned relative to the display, and such that they reflect the different segments of the light source array, the installation of the light source array is further improved.

The light source array may be adapted to be reduced in length, and the light source array may be segmented in the first, the second and a third segment based on the dimensions of the display and the dimensions of the light source array. The third segment may be the distal end of the light source array. A light source array typically comprises a control unit on a proximal end of the light source array which controls the lighting units of the light source array. The distal end of the light source array is the end of the light source array at which lighting units can be removed (e.g. cut, disconnected). The first segment may comprise the lighting units located at the proximal end, and the second segment may comprise the lighting units located in between the lighting units of the first and third segment.

The method may further comprise:

- controlling lighting units of the third segment according to a third light setting, or
- switching lighting units of the third segment off. The third segment is indicative of a part of the light source array that can be removed from the light source array, for instance when the light source array is too long and comprises lighting units which should not be installed at the display. The lighting units of the third segment may be controlled according to a light setting different from the second light setting to indicate the third segment. They may be switched off. For safety reasons, the user may be instructed (e.g. via a user interface) to power off the light source array before reducing the light source array in length.

The first information may be received from (a display device comprising or providing) the display. Additionally or alternatively, the second information is received from the light source array. The display may, for example, provide information about its type, which type information may be used to retrieve information about the display's dimensions, or the display may for example provide the dimensions directly. The light source array may, for example, provide information about its type, which type information may be used to retrieve information about the light source array's dimensions, or the light source array may for example provide the dimensions directly.

Alternatively, the first and/or the second information may be received from the user via a user interface. The user may provide user input indicative of the first and/or second information via the user interface (e.g. via a touch screen, by taking an image, by providing voice commands, etc.). The user may, for example, provide user input indicative of the dimensions of the display and/or user input indicative of the dimensions of the light source array and optionally a distribution (e.g. a number per length unit) of the individually controllable lighting units.

The first information may comprise an identifier, a type and/or a product name or number of the display, and the dimensions of the display may be determined based on the first information. Additionally or alternatively, the second information may comprise an identifier, a type and/or a product name or number of the light source array, and the dimensions of the light source array may be determined based on the second information. Optionally, the distribution, size, order, number and/or pitch of the individually controllable lighting units on the light source array may be determined based on the second information.

The method may further comprise:

- receiving secondary second information indicative of dimensions of a second light source array,
- virtually segmenting the second light source array into a plurality of secondary segments based on the dimensions of the display, the dimensions of the light source array and the dimensions of the second light source array, wherein each secondary segment comprise a plurality of individually controllable lighting units, wherein a length of a first secondary segment corresponds to at least a part of one of the sides of the display,
- controlling lighting units of the secondary first segment according to a secondary first light setting. If a user wishes to install two light source arrays at the display, information on how to position both light source arrays is provided by controlling segments of both light source arrays to indicate how to position them. This improves installing two light source arrays with respect to a display. If two segments of different light source arrays are to be installed at the same side of the display, they may be controlled according to the same or a similar light setting.

The method may further comprise:

- obtaining location information indicative of locations of one or more further lighting devices relative to the display, and
- selecting the first side and the second side based on the locations of the one or more further lighting devices. A user may have already installed other lighting devices in relation to the display. These lighting devices may be configured to be controlled based on media content rendered on the display. It is therefore beneficial to take these lighting devices into account when determining how to position (and therewith how to segment) the light source array with respect to the display.

The light source array may comprise a mounting means for mounting the light source array on a surface behind or proximate to the display. The surface may be the back of the display, or a surface such as a furniture element or wall behind the display. The mounting means may, for example, be one or more adhesive surfaces, one or more magnets, one or more fastening pins/holes, one or more screws/screw holes, etc.

The different segments of the plurality of segments may indicate to the user where to fold, bend and/or cut the light source array. The light source array may be configured to be folded or a support surface of the lighting units may be partially cut which enables the user to fold/cut the light source array between the first and second segment such that the second segment can be placed at the second side of the display. This improves installing the light source array for a user.

The method may further comprise: receiving an input indicative of a distance, the distance being a distance between a respective side of the display and a respective segment, and wherein the segmentation is further based on the distance. The (desired) distance indicates a distance between an edge of the display and the light source array. It may, for example, be desirable that the light source array is positioned behind the display, next to the display, on the edge of the display, etc. The distance may be predefined or user-defined (e.g. by providing a user input via a user interface).

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a control system for assisting a user in installing a light source array at a display, the light source array comprising multiple individually controllable lighting units, the control system comprising:

- a communication unit configured to communicate with the light source array, and
- a processor configured
- to receive first information indicative of dimensions of the display, and to receive second information indicative of dimensions the light source array,
- to virtually segmenting the light source array into a plurality of segments based on the dimensions of the display and the dimensions of the light source array, wherein each segment comprises a plurality of individually controllable lighting units of the multiple individually controllable lighting units, wherein a length of a first segment corresponds to at least a part of a length of a first side of the display, and wherein a length of a second segment corresponds to at least a part of a length of a second side of the display,
- to control, via the communication unit, lighting units of the first segment according to a first light setting, and
- to control, via the communication unit, lighting units of the second segment according to a second light setting different from the first light setting.

It should be understood that the computer program product and the control system may have similar and/or identical embodiments and advantages as the above-mentioned methods.

In the context of the present invention the term “virtually segmenting” is to be understood as virtually dividing the light source array into a plurality of segments which can be controlled as segments. Each segment comprises a plurality of individually controllable lighting units that are controllable as a group.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
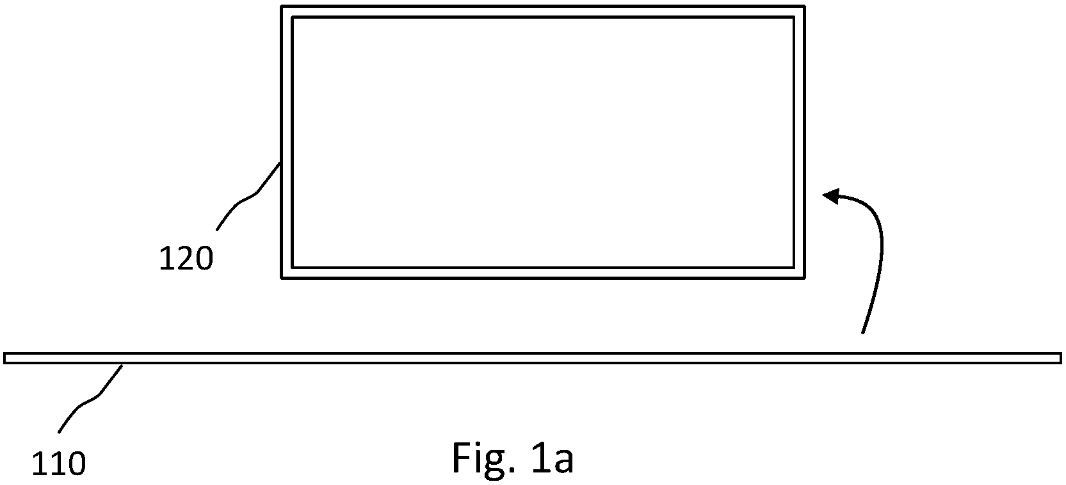
FIG. 1*a* shows schematically prior art wherein a light source array is to be installed at a display.
Figure 1B:
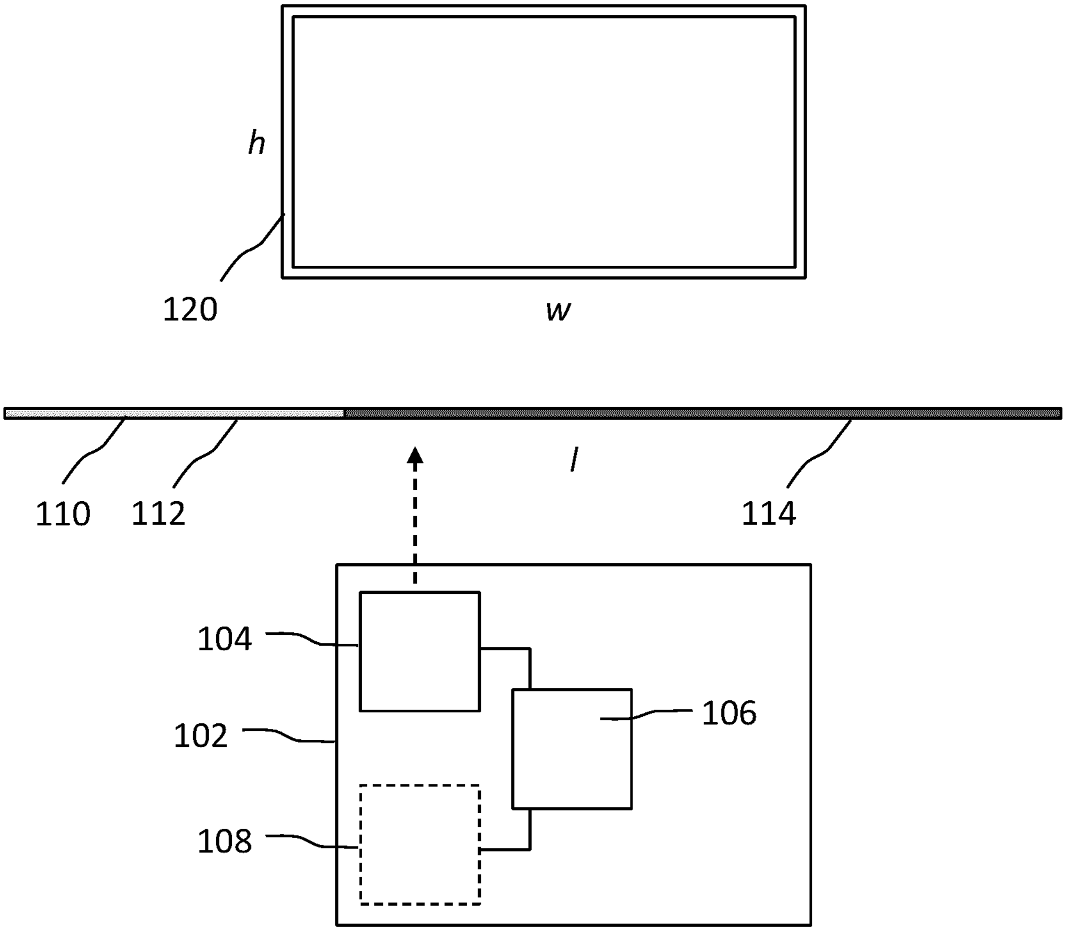
FIG. 1*b* shows schematically a control system for assisting a user in installing a light source array at a display.

FIG. 1*a* shows a display 120 and a light source array 110. The light source array 110 is to be installed at the display 120. A user may not know how to install the light source array 110 (e.g. a light strip) at the display device 120 (e.g. a TV), and the user has to calculate or simply guess how to position the light source array 110 with respect to the display 120. The control system 102 illustrated in FIG. 1*b* assists the user in installing the light source array 110 at the display 120.

The light source array 110 comprises multiple individually controllable lighting units (not shown). The multiple individually controllable lighting units may be single (LED) light sources of the light source array 110, or (small) groups of (LED) light sources (e.g. groups of 3 or S light sources). The light source array 110 comprises a controller for controlling the multiple individually controllable lighting units to generate a spatial light effect across the different multiple individually controllable lighting units. The light source array 110 further comprises a receiver configured to receive lighting control commands from the control system 102 and the controller may control the multiple individually controllable lighting units accordingly. Control methods for such (pixelated) light source arrays are known in the art and will therefore not be discussed in detail.

The control system 102 comprises a communication unit 104 configured to communicate with the light source array 110. The communication unit 104 may communicate lighting control commands to the light source array 110 to control the multiple individually controllable lighting units. The communication unit 104 may comprise hardware for transmitting the lighting control commands via one or more communication protocols for example Ethernet, DMX, DALI, USB, Bluetooth, Wi-Fi, Li-Fi, 3G, 4G, 5G or ZigBee. A specific communication technology may be selected based on the communication capabilities of the light source array, the power consumption of the communication driver for the (wireless) communication technology and/or the communication range of the signals.

The control system 102 further comprises a processor 106 configured to receive first information indicative of dimensions of the display 120 (h and w), and to receive second information indicative of dimensions the light source array 110 (l). The first and second information may be received via the same or via a different communication protocol that is used for communicating with the light source array 110. The dimensions of the display 120 may for example be the dimensions of the display, or the dimensions of a display device comprising the display. Some display devices comprise a frame around the display 120, which may be taken into account when determining how to position the light source array 110 at the display 120. The dimensions of the display 120 may for example be indicative of the height h and width w of the display 120. The dimensions of the light source array 110 comprises at least the length/of the light source array 110. Additionally, the dimensions of the light source array 110 comprises the width of the light source array 110.

The first information indicative of the dimensions of the display 120 may be received from the display 120 via the communication unit 104. Additionally or alternatively, the second information indicative of the dimensions of the light source array 110 may be received from the light source array 110 via the communication unit 104. The first information may comprise an identifier, a type and/or a product name or number of the display 120, and the dimensions of the display 120 may be determined based on the first information. Additionally or alternatively, the second information may comprise an identifier, a type and/or a product name or number of the light source array 110, and the dimensions of the light source array 110 may be determined based on the second information. Optionally, the distribution of the multiple individually controllable lighting units on the light source array may be determined based on the second information. The display 120 may, for example, provide information about its type, and the processor 106 may use the type information to retrieve information about the display's dimensions, for instance from a (remote) database storing information about displays, or the display may for example communicate its dimensions directly. The light source array 110 may, for example, provide information about its type, and the processor 106 may use the type information to retrieve information about the light source array's dimensions, for instance from a (remote) database storing information about light source arrays, or the light source array may for example provide the dimensions directly. Alternatively, the first and/or the second information may be received from the user via a user interface of a user interface device 130. The user may provide user input indicative of the first and/or second information via the user interface (e.g. via a touch screen, by taking an image, by providing voice commands, etc.). The user may, for example, provide user input indicative of the dimensions of the display 120 and/or user input indicative of the dimensions of the light source array 110 and optionally a distribution (e.g. a number per length unit) of the multiple individually controllable lighting units. A user may capture an image of the light source array 110 and/or the display 120 (e.g. with a camera of a user interface device 130), and the image may be analyzed to retrieve the first and/or second information. The dimensions may be determined based on image information of the analyzed image, or the type/identifier of the light source array 110 and/or the display 120 may be determined based on image information of the analyzed image and the dimensions may be determined based thereon.

The processor 106 is further configured to virtually segment the light source array 110 into a plurality of segments based on the dimensions of the display 120, the dimensions of the light source array 110 and, optionally, the distribution of the individually controllable lighting units. Each segment comprises a plurality of individually controllable lighting units of the multiple individually controllable lighting units, wherein a length of a first segment 112 corresponds to at least a part of a length of a first side of the display 120, and wherein a length of a second segment 114 corresponds to at least a part of a length of a second side of the display 120. The processor 106 is further configured to control (after the segmentation), via the communication unit 104, lighting units of the first segment according to a first light setting, and to control, via the communication unit 104, lighting units of the second segment according to a second light setting different from the first light setting. The processor 106 may transmit one or more lighting control commands to the light source array 110 to control the different segments according to the different light settings.

Figure 2A:
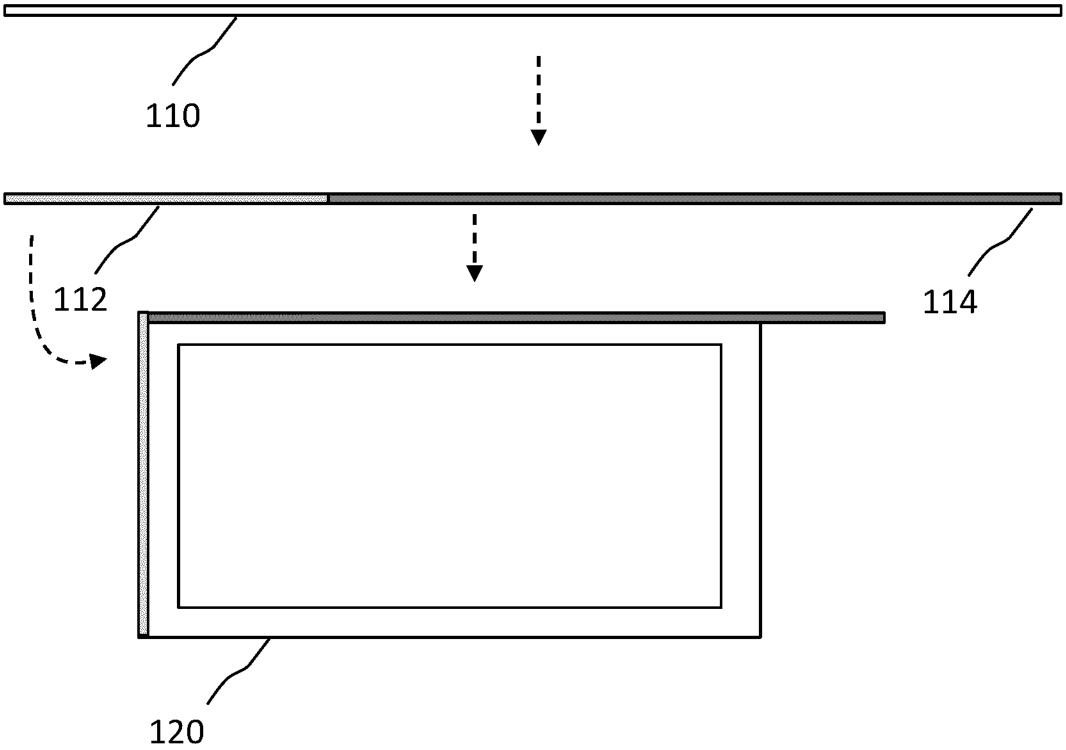
FIG. 2*a* shows schematically an example of a segmentation of a light source array to be installed at a display.
Figure 2B:
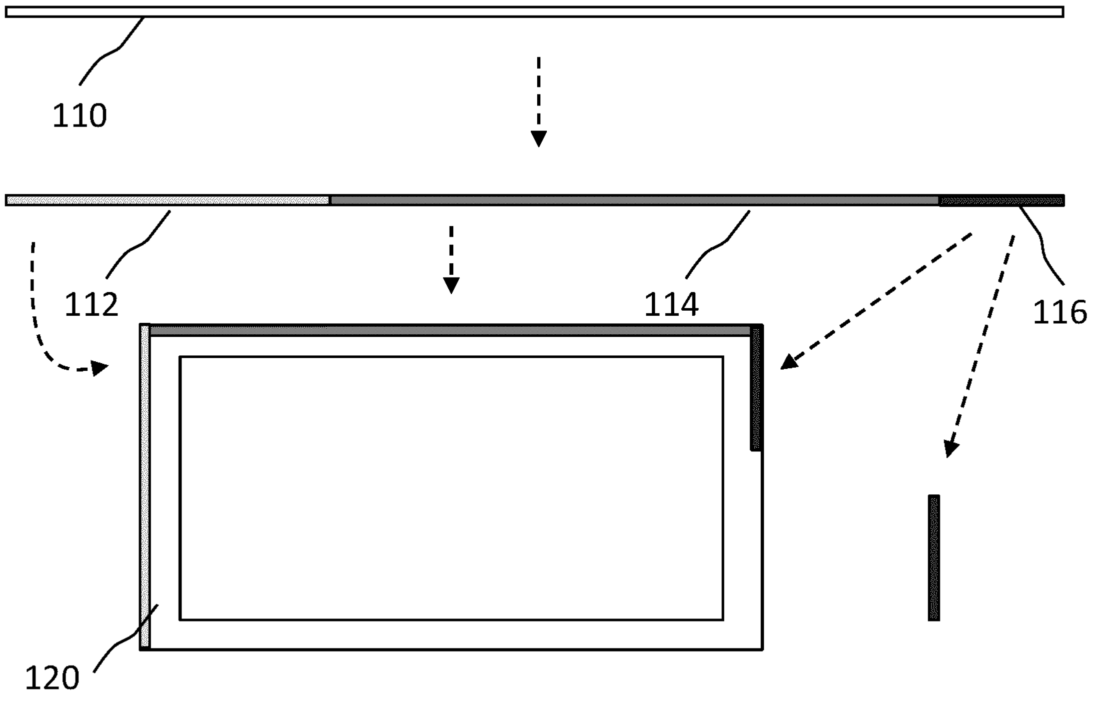
FIG. 2*b* shows schematically an advanced example of a segmentation of a light source array to be installed at a display.
Figure 2C:
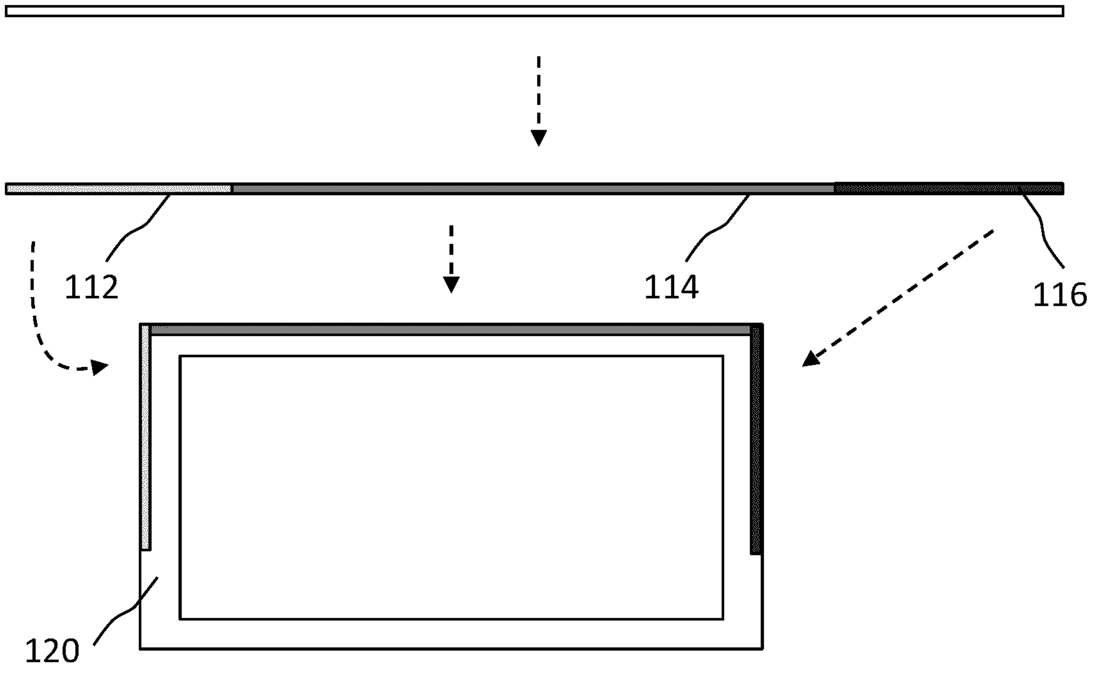
FIG. 2*c* shows schematically an advanced example of a segmentation of a light source array to be installed at a display.

The processor 102 may, for example, determine the lengths of the first segment and the length of the second segment such that the length of the first and/or the second segment are substantially equal to the respective sides of the display. FIGS. 2*a*-2*c* illustrate examples of segmenting the light source array 110. In FIG. 2*a*, the light source array 110 has been segmented in a first segment 112 and a second segment 114. The processor 106 has controlled the first segment 112 according to a first light setting (indicated by the light gray color), and the second segment 114 according to a second light setting (indicated by the medium gray color). The length of the first segment 112 has been determined such that it is substantially equal to the length of the left side of the display 120. In this example, the length of the second segment 114 is longer than the top side of the display 120, resulting in that the right-most part of the second segment 114 should either be removed (e.g. cut or disconnected) from the light source array 110, or be positioned on the right side of the display 120. This has been illustrated in FIG. 2*b*, wherein the light source array 110 has been divided in three segments 112, 114, 116. The processor 106 has controlled the first segment 112 according to a first light setting (indicated by the light gray color), the second segment 114 according to a second light setting (indicated by the medium gray color), and the third segment 116 according to a third light setting (indicated by the dark gray color). In this example, the third segment 116 may be positioned at the right side of the display 120, or it may be removed from the light source array 110 (e.g. disconnected, cut, etc.).

The processor 106 may be further configured to determine a number of segments and the lengths of the segments wherein that at least two segments have the same length and/or such that an axis of symmetry is created across the light source array 110. This has been illustrated in FIG. 2*c*, which shows a segmentation of the light source array 110, wherein the length of the second segment 114 has been determined such that its length corresponds to the top side of the display 120, and such that the lengths of the first and third segments 112, 116 are substantially equal, thereby creating an axis of symmetry. A user may then install the light source array 110 accordingly at the display 120.

The control system 102 may for example be comprised in a lighting control device, or in a lighting configuration device. The control system 102 may for example be comprised in a user interface device 130 such as a smartphone, a tablet pc, a central (home) control system, etc. Alternatively, the control system 102 may for example be running on an (external) server or on a gateway (e.g. a bridge).

The light source array 110 may be any type of light source array 110 configured to be positioned at a display 120. The light source array 110 may for example be a light strip, a light string, a modular lighting device comprising a plurality of interconnectable elements, etc. FIGS. 3*a*-3*e* illustrate examples of light source arrays. The light source arrays may comprise a controller 300 for controlling the (LED) light sources (illustrated as small squares in FIGS. 3*a*-3*g*). Alternatively, the light source arrays may comprise multiple controllers 300 for controlling the light sources. The light sources may for example comprise one or more LEDs (e.g. multicolor LEDs, groups of LEDs, etc.).

Figure 3A:
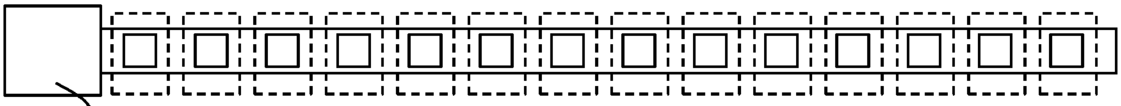
FIGS. 3*a*-3*h* illustrate examples of light source arrays.
Figure 3B:
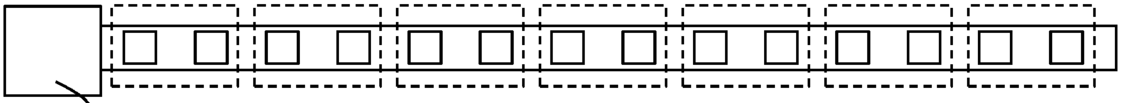
Figure 3C:
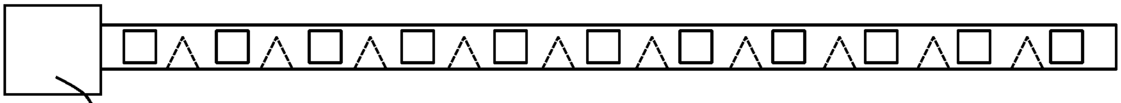
Figure 3D:
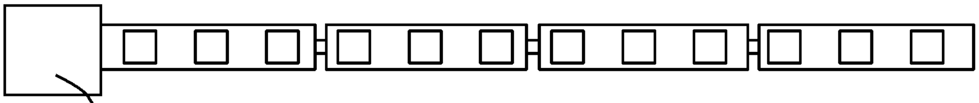
Figure 3E:
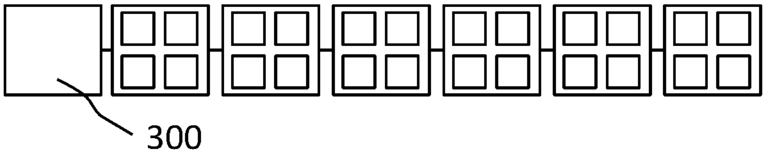

FIG. 3*a* illustrates an example of a light source array, wherein the light source array is a light strip. The dashed lines indicate the individually controllable lighting units. In this example, each individually controllable lighting unit comprises a light source. FIG. 3*b* illustrates an example of a light source array, wherein the light source array is a light strip. The dashed lines indicate the individually controllable lighting units. In this example, each individually controllable lighting unit comprises a plurality of light sources that are controlled as a group. FIG. 3*c* illustrates an example of a light source array, wherein the light source array is a light strip. The light strip may comprise a support surface configured to be partially cut between the light sources/individually controllable lighting units (indicated by the dashed triangles) without cutting power and control lines, which enables a user to fold the light strip at the cut in order to position the light strip at a corner of the display 120. FIG. 3*d* illustrates an alternative, wherein the light source array comprises connectors between lighting units, which enable a user to increase or reduce the length of the light source array. FIG. 3*e* illustrates an example of a light source array, wherein the light sources are positioned in a two-dimensional configuration (e.g. a tile arrangement), and wherein the light source array comprises connectors between lighting units which enable a user to increase or reduce the length of the light source array.

Figure 3F:
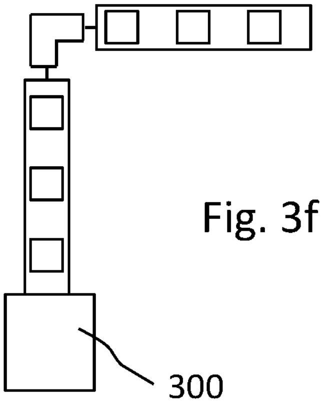
Figure 3G:
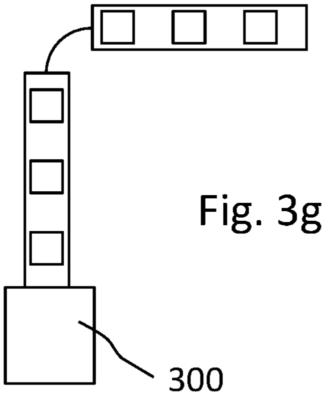
Figure 3H:
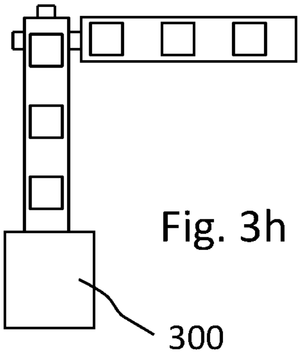

The light source array 110 is configured to be installed at the display 120, which often requires the light source array to be installed along a corner of the display 120. The differently controlled segments of the plurality of segments indicate to the user the location on the light source array 110 where the corner of the display 120 is located when the light source array 110 is installed at the display array 110. Depending on the type of light source array, the user may then create the corner in the light source array 110 such that it matches the corner of the display 120. The light source array 110 may, for example, be adapted to be folded, bent and/or cut (see FIG. 3*c*). Additionally or alternatively, the light source array 110 may comprise connectors between the lighting units, and a user may connect the different lighting units under an angle to create the corner. FIGS. 3*f*-3*h* illustrate different examples of creating a corner with multiple lighting units. For instance, as illustrated in FIG. 3*f*, a corner connector element may be positioned between two lighting units (and therewith between two segments). Alternatively, as illustrated in FIG. 3*g*, a flexible connector may be positioned between two lighting units (and therewith between two segments). Additionally or alternatively, as illustrated in FIG. 3*h*, a (distal) end of a segment may comprise multiple connectors oriented in different directions, such that another segment can be connected to the (distal) end.

The light source array 110 may be adapted to be reduced in length. The processor 106 may be configured to segment the light source array 110 in the first, the second and a third segment based on the dimensions of the display 120 and the dimensions of the light source array 110. The third segment may be the distal end of the light source array 110. The third segment 116 is indicative of a part of the light source array 110 that can be removed from the light source array 110, for instance when the light source array 110 is too long and comprises lighting units which should not be installed at the display 120. A light source array 110 typically comprises a controller (control unit) on a proximal end of the light source array 110 which controls the lighting units of the light source array 110. The distal end of the light source array 110 is the end of the light source array 110 at which lighting units can be removed (e.g. cut, disconnected). This has been illustrated in FIG. 2*b*, wherein the processor may control the third segment 116 according to a third light setting to indicate to a user that it can be removed from the light source array 110. As illustrated in FIG. 2*b*, the first segment 112 may comprise the lighting units located at the proximal end, and the second segment 114 may comprise the lighting units located in between the lighting units of the first and third segment. The lighting units of the third segment may be switched off. For safety reasons, the user may be instructed (e.g. via a user interface device 130) to power off the light source array 110 before reducing the light source array 110 in length.

The light source array 110 may comprise a mounting means for mounting the light source array 110 on a surface behind or proximate to the display 120. The surface may be the back of the display 120, or a surface such as a wall behind or next to the display. The mounting means may, for example, be one or more adhesive surfaces, one or more magnets, one or more fastening pins/holes, one or more screws/screw holes, etc.

It should be understood that the above-mentioned light source arrays are mere examples, and that the skilled person is able to design alternative light source arrays or to combine different aspects of these light source arrays without departing from the scope of the appended claims.

Figure 4:
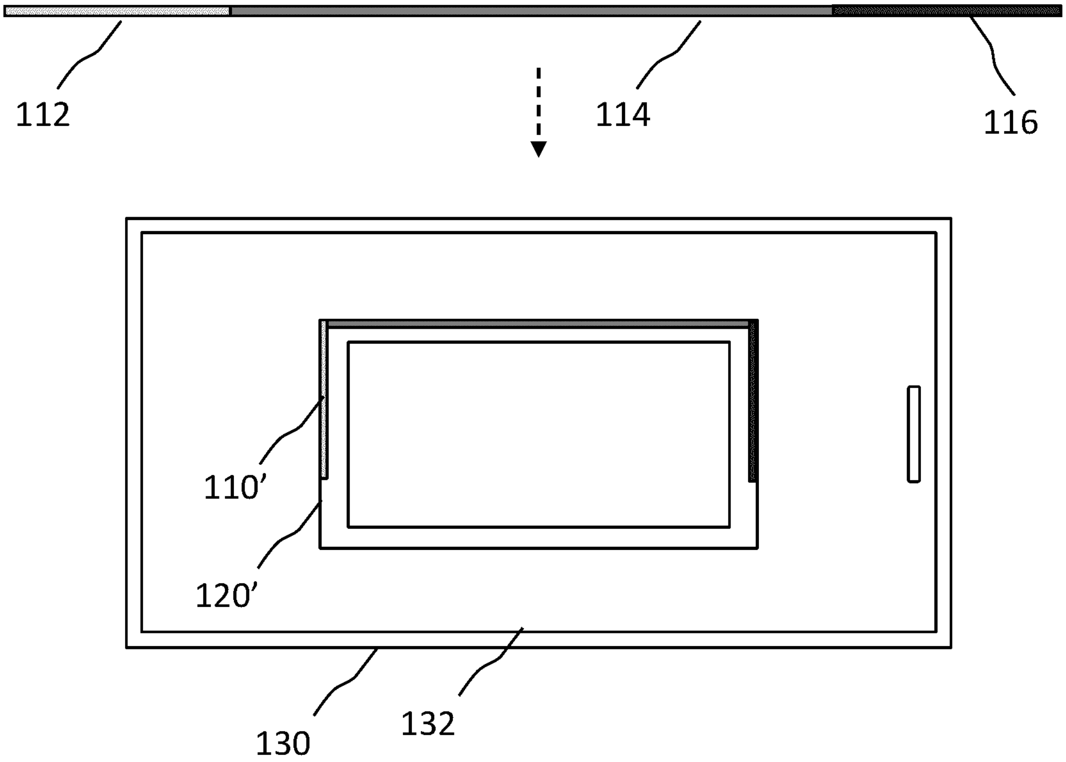
FIG. 4 shows schematically an exemplary installation of a light source array on a screen of a user interface device.

The processor 106 may be further configured to instruct a user interface device 130 to render, on a screen 132 of a user interface device 130, a first virtual representation 120' of the display 120 and a second virtual representation 110' of the light source array 110, wherein the second virtual representation 110' reflects the first and second segments of the light source array 110, and wherein the second virtual representation 110' is rendered on the screen 132 such that a position of the first segment is proximate to the first side of the display on the screen 132, and such that a position of the second segment is proximate to the second side of the display on the screen 132. FIG. 4 illustrates an example wherein a user interface device 130 comprises a screen (a display) 132 that renders a first virtual representation 120' (e.g. an image of the display 120, a graphic representation of the display, etc.) of the display 120 and a second virtual representation 110' of the light source array 110. The user interface device 130 shows the mapping of the light source array 110 onto the display 120. In the example of FIG. 4, the user interface device 130 shows the mapping of FIG. 2*c*. In this example, the second virtual representation 110' is rendered such that the first segment 112 is positioned at the left side of the first virtual representation 120' of the display 120, such that the second segment 114 is positioned at the top side of the first virtual representation 120' of the display and such that the third segment 116 is positioned at the left side of the first virtual representation 120' of the display. The light settings of the different segments 112, 114, 116 of the light source array 110 are reflected by the second virtual representation 110'. This further assists the user in installing the light source array 110 at the display 120, because the virtual representations 110', 120' show at which respective side a respective segment should be positioned. In embodiments wherein the processor 106 is comprised in the user interface device 130, the processor 106 may be configured to control the screen 132 of the user interface device 130. Alternatively, in embodiments wherein the processor is comprised in a device remote from the user interface device 130, the processor 106 may communicate instructions to the user interface device 130 to render the virtual representations 110', 120'.

The processor 106 may be further configured to instruct the user interface device 130 to render, on the screen 132, a plurality of mappings (e.g. simultaneously, or a user may cycle thorough the plurality of mappings), and the user interface device 130 may be configured to receive user input via a user interface (e.g. a touch screen) indicative of a selection of a mapping. The processor 106 may then segment the light source array 110 accordingly and control the different segments accordingly. The user interface device 130 may, for example, render the different mappings of FIGS. 2*a*, 2*b* and 2*c*, and a user may select one of these mappings, whereupon the lighting units of the light source array 110 are controlled accordingly.

The user may wish to install multiple light source arrays at the display 120. The processor 106 may be configured to receive secondary second information indicative of dimensions of a second light source array, and to virtually segment the second light source array into a plurality of secondary segments based on the dimensions of the display 120, the dimensions of the light source array 110 and the dimensions of the second light source array, wherein each secondary segment comprise a plurality of individually controllable lighting units, wherein a length of a first secondary segment corresponds to at least a part of one of the sides of the display. The processor 106 may apply similar methods as used for the (first) light source array 110 to segment the second light source array. The length of the secondary first segment may, for example, be determined such that the secondary first segment complements a segment of the (first) light source array 110 such that a side of the display is covered by both the segment of the (first) light source array 110 and the secondary first segment. The processor 106 may determine a secondary second segment of the second light source array such that a length of the secondary second segment corresponds to at least a part of a length of a third side of the display 120. In other words, the (first) light source array 110 may be segmented such that it corresponds to a (part of) first side and to a part of the second side of the display 120, and the second light source array may be segmented such that it corresponds to another part of the second side of the display 120 and to (a part of) the third side of the display 120. The processor 106 may be further configured to control lighting units of the secondary segments according to different secondary light settings, or if two segments of different light source arrays are to be installed at the same side of the display, they may be controlled according to the same or a similar light setting (e.g. the same color or similar colors (e.g. different shades of the same color)).

The processor 106 may be further configured to obtain location information indicative of locations of one or more further lighting devices (or their respective light effects) relative to the display 120, and to select the first side and the second side based on the locations of the one or more further lighting devices (or their respective light effects). Additionally, the processor 106 may be configured to determine the lengths of the segments based on the locations of the one or more further lighting devices. The location information may be obtained from an (indoor) positioning system (e.g. an RF-based positioning system that uses triangulation or trilateration, a VLC based positioning system, a VSLAM positioning system, etc.) configured to detect the locations of the lighting devices and the display 120. Alternatively, the location information may have been provided on via a user interface (e.g. via a touch screen that displays a map of the space, which allows a user to position lighting devices at locations relative to a display 120). Such (indoor) positioning systems are known in the art and will therefore not be discussed in detail.

Figure 5:
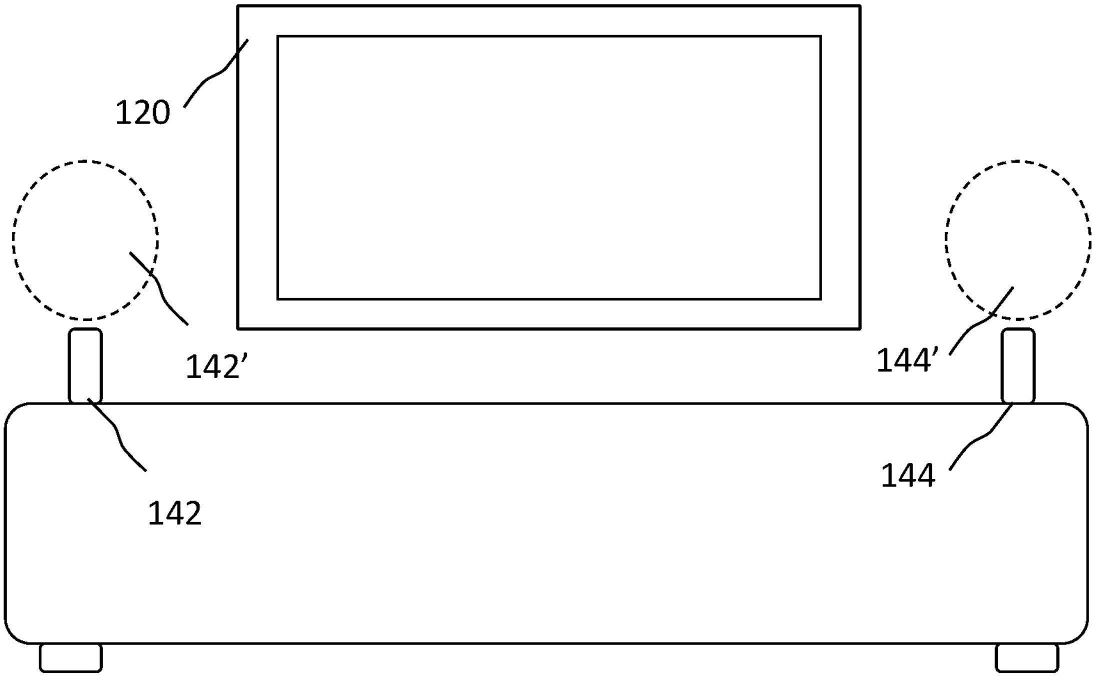
FIG. 5 shows schematically a tv-cabinet, a display and two lighting devices.

FIG. 5 illustrates an example of an environment comprising a first further lighting device 142 configured to create light effect 142' on a wall behind the display 120, and a second further lighting device 144 configured to create light effect 144' on the wall behind the display 120. The processor 106 may obtain location information indicative of locations these further lighting devices relative to the display 120, which are left and right of the display 120. Based on this location information, the processor 106 may determine to determine the position the light source array 110 on the top side of the display 120, for example such as illustrated in FIG. 2*c*. If, for example, the environment would only comprise the second further lighting device 144 (and not the first further lighting device 142), the processor 106 may determine to position the light source array 110 on the left side of the display 120 (as illustrated in FIG. 2*a*).

The processor 106 may be further configured to receive an input indicative of a distance, the distance being a distance between a respective side of the display and a respective segment, and the processor 106 may determine the segmentation further based on the distance. The (desired) distance is the distance at which the light source array 110 is to be position with respect to the edge of the display. If, for example, the light source array 110 is to be positioned on the edge of the display 120 (as illustrated in the examples of FIGS. 2*a*-2*c*), the desired distance may be 0. The desired distance may be such that the light source array 110 will be positioned behind the display 120 (e.g. a negative distance), which would result in shorter segment lengths. The desired distance may be such that the light source array 110 will be positioned next to the display 120 (e.g. a positive distance), which would result in longer segment lengths. The desired distance may be predefined or user-defined (e.g. by providing a user input via a user interface 132 of a user interface device 130).

Figure 6:
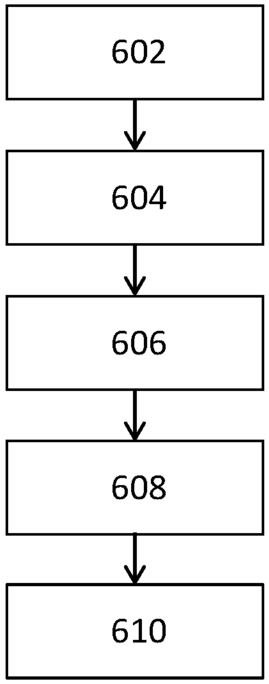
FIG. 6 shows schematically a method of assisting a user in installing a light source array at a display.

FIG. 6 illustrates schematically a method 600 of assisting a user in installing a light source array at a display, the light source array comprising individually controllable lighting units, the method comprising:

receiving 602 first information indicative of dimensions of the display, receiving 604 second information indicative of dimensions the light source array, virtually segmenting 606 the light source array into a plurality of segments based on the dimensions of the display and the dimensions of the light source array, wherein each segment comprises a plurality of individually controllable lighting units, wherein a length of a first segment corresponds to at least a part of a length of a first side of the display, and wherein a length of a second segment corresponds to at least a part of a length of a second side of the display, controlling 608 lighting units of the first segment according to a first light setting, and controlling 610 lighting units of the second segment according to a second light setting different from the first light setting.

The method 600 may be executed by computer program code of a computer program product when the computer program product is run on a processing unit of a computing device, such as the processor 106 of the control system.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of assisting a user in installing a light source array at a display, the light source array comprising multiple individually controllable lighting units, the method comprising:

receiving, by a processor, first information indicative of dimensions of the display, receiving, by the processor, second information indicative of dimensions of the light source array, virtually segmenting, by the processor, the light source array into a plurality of segments based on the dimensions of the display and the dimensions of the light source array, wherein each segment comprises a plurality of individually controllable lighting units of the multiple individually controllable lighting units, wherein a length of a first segment corresponds to at least a part of a length of a first side of the display, and wherein a length of a second segment corresponds to at least a part of a length of a second side of the display, controlling, by the processor via a communication unit, lighting units of the first segment according to a first light setting, and controlling, by the processor via the communication unit, lighting units of the second segment according to a second light setting different from the first light setting.

2. The method of claim 1, further comprising:

rendering, on a screen of a user interface device, a first virtual representation of the display and a second virtual representation of the light source array, wherein the second virtual representation reflects the first and second segments of the light source array, and wherein the second virtual representation is rendered on the screen such that a position of the first segment is proximate to the first side of the display on the screen, and such that a position of the second segment is proximate to the second side of the display on the screen.

3. The method of claim 1, wherein the light source array is adapted to be reduced in length, and wherein the light source array is segmented in the first, the second and a third segment based on the dimensions of the display and the dimensions of the light source array, wherein the third segment is a distal end of the light source array, and wherein the method further comprises:

controlling lighting units of the third segment according to a third light setting, or switching lighting units of the third segment off.

4. The method of claim 1, wherein the first information is received from the display and/or wherein the second information is received from the light source array.

5. The method of claim 1, wherein the first and/or the second information is received from the user via a user interface.

6. The method of claim 1, wherein the first information comprises an identifier, a type and/or a product name or number of the display, and wherein the dimensions of the display are determined based on the first information.

7. The method of claim 1, wherein the second information comprises an identifier, a type and/or a product name or number of the light source array, and wherein the dimensions of the light source array are determined based on the second information.

8. The method of claim 1, further comprising:

receiving, by the processor, secondary second information indicative of dimensions of a second light source array, virtually segmenting, by the processor, the second light source array into a plurality of secondary segments based on the dimensions of the display, the dimensions of the light source array and the dimensions of the second light source array, wherein each secondary segment comprise a plurality of individually controllable lighting units, wherein a length of a first secondary segment corresponds to at least a part of one of the sides of the display, controlling lighting units of the secondary first segment according to a secondary first light setting.

9. The method of claim 1, wherein the method further comprises:

obtaining, by the processor, location information indicative of locations of one or more further lighting devices relative to the display, and selecting the first side and the second side based on the locations of the one or more further lighting devices.

10. The method of claim 1, wherein the light source array comprises a mounting means for mounting the light source array on a surface behind or proximate to the display.

11. The method of claim 1, wherein the first and second segments of the plurality of segments indicate to the user where to fold, bend and/or cut the light source array.

12. The method of claim 1, further comprising:

receiving an input indicative of a distance, the distance being a distance between a respective side of the display and a respective segment, and wherein the segmentation is further based on the distance.

13. A computer program product for a computing device, the computer program product comprising computer program code to perform the method of claim 1 when the computer program product is run on the control system.

14. A control system for assisting a user in installing a light source array at a display, the light source array comprising multiple individually controllable lighting units, the control system comprising:

a communication unit configured to communicate with the light source array, and a processor configured to receive first information indicative of dimensions of the display, and to receive second information indicative of dimensions of the light source array, to virtually segmenting the light source array into a plurality of segments based on the dimensions of the display and the dimensions of the light source array, wherein each segment comprises a plurality of individually controllable lighting units of the multiple individually controllable lighting units, wherein a length of a first segment corresponds to at least a part of a length of a first side of the display, and wherein a length of a second segment corresponds to at least a part of a length of a second side of the display, to control, via the communication unit, lighting units of the first segment according to a first light setting, and to control, via the communication unit, lighting units of the second segment according to a second light setting different from the first light setting.

* * * * *